(12) United States Patent
Lindberg et al.

(10) Patent No.: US 12,358,486 B2
(45) Date of Patent: Jul. 15, 2025

(54) METHOD AND CONTROL ARRANGEMENT FOR CHANGING AN ACTIVATION STATE FOR A POWER TAKE-OFF

(71) Applicant: Scania CV AB, Södertälje (SE)

(72) Inventors: Mikael Lindberg, Huddinge (SE); Linus Stiernstedt, Tullinge (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 18/602,445

(22) Filed: Mar. 12, 2024

(65) Prior Publication Data
US 2024/0317203 A1    Sep. 26, 2024

(30) Foreign Application Priority Data
Mar. 21, 2023 (SE) .................... 2350316-2

(51) Int. Cl.
*B60W 10/02* (2006.01)
*B60K 17/28* (2006.01)
*B60K 25/06* (2006.01)
*B60W 30/188* (2012.01)
*B60W 50/00* (2006.01)

(52) U.S. Cl.
CPC ............. *B60W 10/02* (2013.01); *B60K 17/28* (2013.01); *B60W 30/1888* (2013.01)

(58) Field of Classification Search
CPC .. B60W 10/02; B60W 17/28; B60W 30/1888; B60W 40/06; B60W 50/0097; B60K 25/06; F16D 2500/31; F16D 2500/312
See application file for complete search history.

(56) References Cited

U.S. PATENT DOCUMENTS

| 6,134,494 A | 10/2000 | Stelzle et al. |
| 7,318,788 B2 | 1/2008 | Karlsson et al. |

(Continued)

FOREIGN PATENT DOCUMENTS

| EP | 1285806 A2 | 2/2003 |
| EP | 1567384 B1 | 5/2007 |

(Continued)

OTHER PUBLICATIONS

Scania CV AB, Swedish Patent Application No. 2350316-2, Office Action, Oct. 25, 2023.

*Primary Examiner* — Tinh Dang
(74) *Attorney, Agent, or Firm* — Moore & Van Allen PLLC; W. Kevin Ransom

(57) ABSTRACT

A method is disclosed for changing an activation state of a power take-off (PTO) in a vehicle, where the activation state corresponds to either an activated state, where the PTO transfers a torque between the vehicle's power source for propelling the vehicle and an auxiliary load, or a deactivated state, where no torque is transferred by the PTO between the power source and the auxiliary load. The activation state of the PTO is changed by engaging or disengaging a clutch of the PTO. The method comprising, when the power source is connected to drive wheels of the vehicle, and the activation state of the PTO is to be changed, controlling the clutch to control a rate of change of torque transferred between the power source and the auxiliary load during the change of the activation state of the PTO based on at least one current operating condition of the vehicle.

18 Claims, 6 Drawing Sheets

(56) References Cited

U.S. PATENT DOCUMENTS

| | | | |
|---|---|---|---|
| 8,290,667 | B2 | 10/2012 | Prebeck et al. |
| 8,364,363 | B2 * | 1/2013 | Nakamura ............. B60K 25/06 |
| | | | 701/67 |
| 2006/0148616 | A1 | 7/2006 | Ray et al. |
| 2006/0214035 | A1 | 9/2006 | Albright et al. |
| 2008/0085801 | A1 * | 4/2008 | Sedoni ................... F16H 47/04 |
| | | | 475/72 |
| 2014/0142820 | A1 | 5/2014 | Pociask et al. |
| 2017/0361492 | A1 * | 12/2017 | Datema ................ B28C 5/4217 |
| 2018/0187728 | A1 * | 7/2018 | Vora ..................... A01B 71/063 |
| 2019/0126901 | A1 | 5/2019 | Omran et al. |
| 2022/0135038 | A1 | 5/2022 | Appleton |

FOREIGN PATENT DOCUMENTS

| | | |
|---|---|---|
| WO | 2016182566 A1 | 11/2016 |
| WO | 2017146691 A1 | 8/2017 |

* cited by examiner

METHOD AND CONTROL ARRANGEMENT FOR CHANGING AN ACTIVATION STATE FOR A POWER TAKE-OFF

CROSS-REFERENCE TO RELATED APPLICATIONS

This application claims priority to Swedish Patent Application No. 2350316-2, filed Mar. 21, 2023, of the same title; the contents of which are hereby incorporated by reference.

TECHNICAL FIELD

The invention relates to a method and a control arrangement for changing an activation state for a power take-off.

The invention also relates to a computer program and a computer-readable medium and a vehicle comprising such a control arrangement.

BACKGROUND

The following background description constitutes a description of the background to the invention, which does not, however, necessarily have to constitute prior art.

Power for powering heavy auxiliary load in a vehicle may be generated through the use of a power take-off (PTO). A PTO is a mechanical device that is used to transfer power from an engine or a motor to another piece of equipment such as an auxiliary load consuming energy when activated. Common examples of such auxiliary loads in heavy vehicles are hydraulic pumps used to power hydraulic systems for dump trucks, tow trucks, cranes and other applications that require lifting or pushing heavy loads and air compressors used in fire trucks and other vehicles that require onboard air supply. Also common are winches, vacuum pumps, refrigerator units and power generators.

SUMMARY

It is an objective of the present invention to provide a method and a control arrangement for mitigating or solving drawbacks of conventional solutions. In particular an objective of the present invention is to provide a solution for changing an activation state of a power take-off (PTO) such that increased safety and improved vehicle performance may be obtained.

According to a first aspect of the invention, aforementioned and further objectives are achieved through a method performed by a control arrangement for changing an activation state of a PTO in a vehicle, the vehicle comprising a power source for propelling the vehicle, wherein the activation state of the PTO is either an activated state, during which the PTO is configured to transfer a torque between the vehicle's power source and an auxiliary load, or an deactivated state, during which no torque is transferred by the PTO between the vehicle's power source and the auxiliary load, and wherein the activation state of the PTO is changed by engaging or disengaging a clutch of the PTO, respectively, the method comprising, when the power source is connected to drive wheels of the vehicle, and when the activation state of the PTO is to be changed:
controlling the clutch of the PTO in order to control a rate of change of torque transferred between the vehicle's power source and the auxiliary load during the change of the activation state of the PTO based on at least one current operating condition of the vehicle.

Changing an activation state of the PTO may here be understood as the PTO transitioning between the deactivated state and the activated state, carried out by engaging the PTO clutch or the PTO transitioning between the activated state and the deactivated state, carried out by disengaging the PTO clutch. The speed at which the PTO clutch is engaged, and disengaged, may have a significant impact on the torque transfer between the power source and the auxiliary load, in particular on the rate of change of torque, i.e., the change in torque per time unit. When the PTO clutch is being engaged, it connects the power source to the PTO and allows power to be transferred to the auxiliary load. The faster the clutch is engaged, the higher the maximum resulting rate of change of torque. A similar condition occurs during the disengaging of the PTO clutch. The faster the PTO clutch is disengaged, the higher is the maximum resulting rate of change of torque.

The power source being connected to drive wheels of the vehicle may refer to a condition when torque is transferred between the power source and the vehicle drive wheels.

During engagement and disengagement of the PTO clutch a sudden change in torque may occur in the driveline of the vehicle. Such change in torque may arise when the torque output from the vehicle power source increases or decreases momentarily and before the torque output is adjusted to the required torque output. Large torque changes in the vehicle can potentially affect the stability and/or drivability of the vehicle and lead to involuntary movement of the vehicle or skidding/sliding causing the vehicle's tires to lose traction with the road which may potentially lead to loss of control over the vehicle. This may for example occur if the rate of sudden torque increase or torque decrease is high, i.e., if the rate of change of torque is exceeds a certain safe threshold. Such threshold may depend on one or more current operating conditions of the vehicle, i.e., on one or more parameters related to the current status of the vehicle's components, systems, and performance, as it is currently operated.

The invention enables a control of the rate of change of torque during the change of the activation state based on at least one current operating condition of the vehicle. By controlling the rate of change of torque during the change of the PTO activation state the operation and performance of the vehicle during the PTO activation state change may be controlled such that potentially hazardous situations are mitigated.

Moreover, the PTO may be activated or deactivated also in situations during which activation or deactivation was not previously possible due to potential risk of hazardous situations. Hereby, timely operation of the PTO is enabled. Additionally, the PTO may be activated and deactivated when the vehicle is in motion also in situations when such activation and deactivation could previously only be performed when the vehicle was in stationary due to risk of potentially hazardous situations. Hereby, increased versatility is obtained.

Furthermore, risk of potentially hazardous situations due to human factor i.e., due to the vehicle operator manually activating or deactivating the PTO in situations where safe operation is not ensured is mitigated. Hereby increased safety when operating the vehicle is obtained.

The invention may be implemented wholly or partly in the control arrangement already existing in the vehicle and may utilize existing functionality reducing additional complexity and costs.

In an embodiment of the invention, the clutch of the PTO is controlled such that different rates of change are obtained for different operating conditions of the vehicle.

Hereby, changing the activation state of the PTO may be performed in a safe and controlled manner during different operating conditions.

In an embodiment of the invention, the clutch of the PTO is controlled such that a resulting rate of change of torque during the change of the activation state of the PTO is less than a first torque change limit.

The first torque change limit may be understood as an allowed rate of change of torque transferred from the vehicle power source to the PTO during the PTO activation state change. A rate of change of torque exceeding the first torque change limit may increase the risk of affecting the stability and/or drivability of the vehicle. By controlling the clutch of the PTO such that the resulting rate of change of torque during the change of the activation state of the PTO is less than the first torque change limit the PTO activation state change is performed in a controlled and safe manner.

In an embodiment of the invention, the first torque change limit is based on the at least one current operating condition of the vehicle and/or a torque required to power the auxiliary load.

As a consequence, the allowed rate of change of torque transferred from the vehicle power source to the PTO during the PTO activation state change may be determined in a correct and accurate way. Hereby, controlling the PTO clutch during the PTO activation state change is performed in a reliable way.

In an embodiment of the invention, the changing the activation state of the PTO is carried out over a state change duration, and wherein controlling of the rate of change of torque comprises controlling the state change duration.

The state change duration may here comprise the time for engaging or disengaging the PTO clutch when the PTO activation state change is performed. Hereby, the rate of change of torque during the PTO activation state change may be controlled in an efficient and accurate way.

In an embodiment of the invention, the changing of the activation state of the PTO comprises:
  activating the PTO by engaging the clutch of the PTO when disengaged and wherein controlling of the state change duration comprises controlling the duration of engaging the clutch, and/or
  deactivating the PTO by disengaging the clutch of the PTO when engaged and wherein controlling of the state change duration comprises controlling the duration of disengaging of the clutch.

Hereby, the rate of change of torque may be controlled in an efficient and accurate way during activation and deactivation of the PTO.

In an embodiment of the invention, the current operating condition of the vehicle comprises one or more vehicle related parameters, the one or more vehicle related parameters comprising:
  a vehicle weight,
  a current speed of the vehicle,
  a current engaged gear in the vehicle gear box, and/or
  the torque required to power the auxiliary load.

Thus, the rate of change of torque transferred between the vehicle's power source and the PTO during the change of the activation state of the PTO may be adjusted to the current status of the vehicle's components, systems, and performance. Hereby, the change of the PTO activation state is performed during various operating conditions in a safe and controlled manner.

In an embodiment of the invention, the current operating condition of the vehicle further comprises information related to a coming road section, the information related to the coming road section comprises one or more of:
  an inclination of a coming road section,
  a curvature of a coming road section,
  a characteristic of the surface of a coming road section,
  current traffic conditions along the route travelled by the vehicle, and/or
  current ambient temperature along the route travelled by the vehicle Hereby, the change of the PTO activation state may be performed in the vehicle during various road and traffic conditions in a safe and controlled manner.

In an embodiment of the invention, the method further comprises:
  anticipating a torque change at the drive wheels of the vehicle resulting from the change of the activation state of the PTO, and
  controlling the clutch of the PTO further based on the anticipated torque change at the drive wheels of the vehicle such that the rate of change of torque transferred between the vehicle's power source and the auxiliary load during the change of the activation state of the PTO is reduced when the torque change at the drive wheels of the vehicle exceeds a second torque change limit.

Hereby, operation safety of the vehicle is further increased during the change of the PTO activation state.

According to a second aspect, the invention relates to a control arrangement for changing an activation state of a PTO in a vehicle, the vehicle comprising a power source for propelling the vehicle, wherein the activation state of the PTO is either an activated state, during which the PTO is configured to transfer a torque between the vehicle's power source and an auxiliary load, or an deactivated state, during which no torque is transferred by the PTO between the vehicle's power source and the auxiliary load, and wherein the activation state of the PTO is changed by engaging or disengaging a clutch of the PTO, respectively, the control arrangement being configured to, when the power source is connected to drive wheels of the vehicle, and when the activation state of the PTO is to be changed:
  control the clutch of the PTO in order to control a rate of change of torque transferred between the vehicle's power source and the auxiliary load during the change of the activation state of the PTO based on at least one current operating condition of the vehicle.

It will be appreciated that all the embodiments described for the method aspects of the invention are applicable also to at least one of the control arrangement aspects of the invention. Thus, all the embodiments described for the method aspects of the invention may be performed by the control arrangement, which may also be a control device, i.e. a device. The control arrangement and its embodiments have advantages corresponding to the advantages mentioned above for the methods and their embodiments.

According to a third aspect of the invention, aforementioned and further objectives are achieved through a vehicle comprising the control arrangement of the second aspect. The vehicle may for example be a bus, a truck, or a car.

According to a fourth aspect, the invention relates to a computer program comprising instructions which, when the program is executed by a computer, cause the computer to carry out the method according to the first aspect.

According to a fifth aspect, the invention relates to a computer-readable medium comprising instructions which, when executed by a computer, cause the computer to carry out the method according to the first aspect.

The above-mentioned features and embodiments of the method, the control arrangement, the vehicle, the computer program, and the computer-readable medium, respectively, may be combined in various possible ways providing further advantageous embodiments.

Further advantageous embodiments of the method, the control arrangement, the vehicle, the computer program, and the computer-readable medium according to the present invention and further advantages with the embodiments of the present invention emerge from the detailed description of embodiments.

BRIEF DESCRIPTION OF THE DRAWINGS

Embodiments of the invention will be illustrated in more detail below, along with the enclosed drawings, where similar references are used for similar parts, and where.

DETAILED DESCRIPTION

A power take-off (PTO) is normally connected to a vehicle engine or motor through a direct mechanical connection via e.g., a PTO clutch. Typically, such PTO clutch may be automatically engaged and disengaged, based on a manual request from the vehicle operator or on an automatic request, when the vehicle is stationary or in motion, depending on the specific application. However, there are some potential problems that may be encountered when engaging or disengaging the PTO, involving risks of disrupting the drive train momentum, i.e., the torque that currently is propelling the vehicle. This can be particularly dangerous if the stability of the vehicle is affected when the vehicle is in motion. It is therefore important that the operator is aware of the potential hazards and takes it into consideration when requesting activation or deactivation of the PTO such that safe and efficient operation may be ensured.

Normally, safety may be ensured during standstill by applying a brake when the PTO is to be activated or deactivated. However, activating or deactivating the PTO when the vehicle is in motion during conditions involving the above mentioned risks can lead to potentially hazardous situations.

It is thus an objective of the present invention to provide a method and a control arrangement for changing an activation state of a PTO such that these problems are at least partly solved.

Figure 1A:
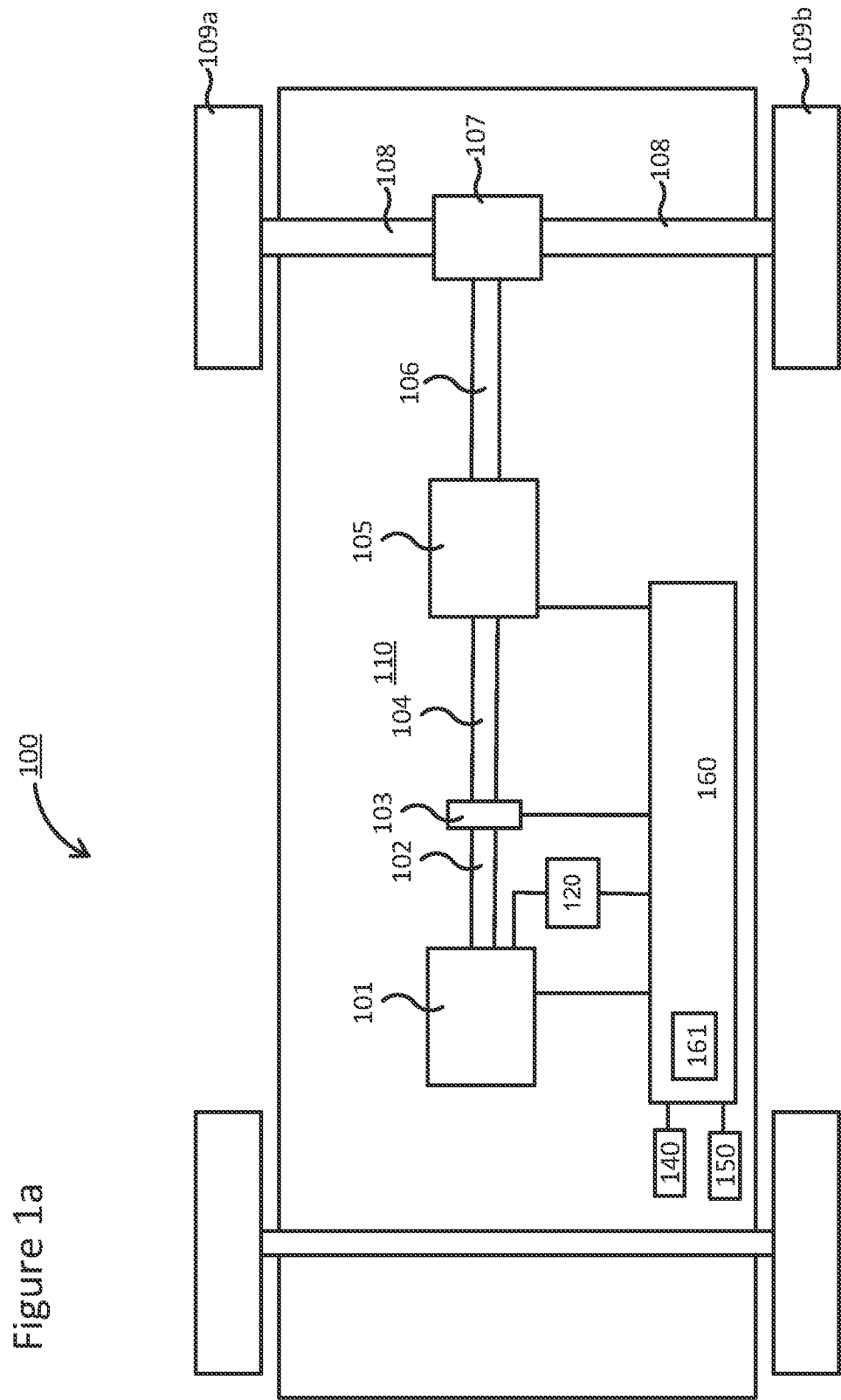
FIG. 1a shows a schematic view illustrating an exemplary vehicle in which embodiments of the present invention may be implemented.

FIG. 1a, which will be used to explain the herein presented embodiments, schematically illustrates a vehicle 100. The vehicle 100 may, for example, be a heavy vehicle such as a car, a bus, or a truck.

The vehicle 100 comprises at least one drive wheel, e.g. one pair of drive wheels 109a, 109b as illustrated in FIG. 1a. The vehicle furthermore comprises a driveline/drivetrain 110 configured to transfer torque between at least one power source/drive unit 101, such as e.g. an engine, and the drive wheels 109a, 109b. The at least one power source 101 may include a combustion engine. In embodiments of the invention, the vehicle may be an electric vehicle instead comprising a drive unit 101 comprising at least one electric machine or be a hybrid vehicle comprising a combination of a combustion engine and one or more electric machines. For simplification, the term power source in this disclosure also includes such drive units.

The power source 101 may, in a customary fashion, via an output shaft 102 of the power source 101, be connected to a clutch 103, and via the clutch 103 also to a gearbox 105. The torque provided by the power source 101 is thus provided to an input shaft 104 of the gearbox 105. A propeller shaft 106, connected to an output shaft of the gearbox 105, drives the drive wheels 109a, 109b via a central gear 107, such as e.g. a customary differential, and drive shafts 108 connected with the central gear 107. Also, one or more electrical machines may be arranged essentially anywhere along the driveline 110, as long as torque is provided to one or more of the wheels, e.g. adjacent to one or more of the wheels as is understood by a skilled person.

Figure 1B:
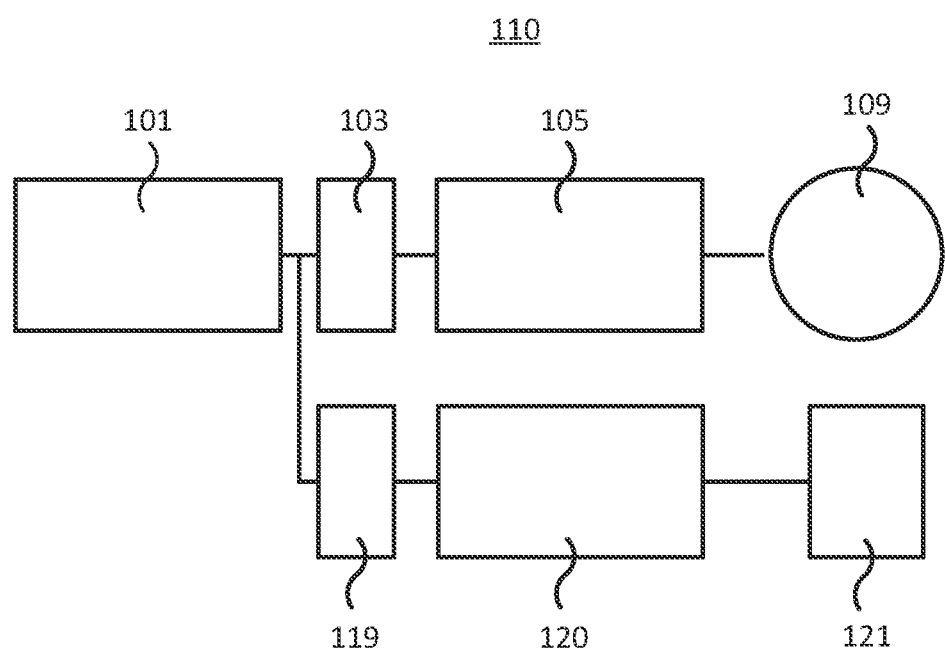
FIG. 1b shows a schematic view illustrating one example of vehicle configuration comprising a PTO, in which vehicle embodiments of the present invention may be implemented.

According to the invention, the vehicle may further comprise a PTO 120, configured to, when coupled to the power source 101, transfer power from power source 101 to another piece of equipment (not illustrated), as will be explained in more detail with reference to FIG. 1b.

The vehicle 100 may also comprise a control arrangement 160. The control arrangement 160 may be distributed on several control units configured to control different parts of the vehicle 100. The control arrangement 160 may e.g. include a controlling unit 161 arranged for performing the method steps of the disclosed invention as is explained further on. The control arrangement 160 may further be configured for controlling one or more of the at least one power source 101, the clutch 103, the gearbox 105, the PTO 120 and components thereof and/or any other units/devices/entities of the vehicle 100. However, in FIG. 1a, only the units/devices/entities of the vehicle 100 useful for understanding the invention are illustrated. The control arrangement 160 will be described in further detail in FIG. 5.

The vehicle 100 may further include one or more sensors 140, e.g., at least one camera located at suitable positions within the vehicle 100 and a positioning system/unit. The positioning unit may be based on a satellite navigation system such as the Navigation Signal Timing and Ranging (Navstar), Global Positioning System (GPS), Differential GPS (DGPS), Galileo, GLONASS, or the like. Thus, the positioning unit may comprise a GPS receiver.

The vehicle 100 may further include at least one communication device 150 arranged for communication with at least one external entity, such as at least one communication entity of another vehicle. Correspondingly, the at least one communication device 150 may be a vehicle-to-vehicle (V2V) communication device, a vehicle-to-infrastructure (V2I) communication device, a vehicle-to-everything (V2X) communication device, and/or a wireless communication device such that communication between the vehicle and the at least one external entity is achieved/provided.

As previously explained, the vehicle 100 comprises a PTO 120 configured to transfer power from the power source 101 to an auxiliary load. There are several ways to couple a PTO 120 to a power source 101 in a vehicle, depending on vehicle configuration and specific applications and requirements. FIG. 1b, schematically illustrates one exemplary method of such coupling. FIG. 1b shows the vehicle power source 101 configured to propel the vehicle 100, connected, as previously to the drive wheels 109 via a gearbox 105 and a clutch 103. Moreover, FIG. 1b shows the PTO 120, coupled to the power source 101 by means of a PTO clutch 119. The PTO clutch 119 may for example be connected to an engine output shaft as illustrated in FIG. 1b. When the PTO clutch 119 is engaged, the PTO transfers power from the power source 101 to the auxiliary load 121. It is to be understood that the invention is not limited to any specific way of coupling the PTO to the power source 101.

The proposed invention will now be described with reference to a method 200, disclosed in FIG. 2a for changing an activation state of a PTO 120 in a vehicle, such as the vehicle 100 comprising a power source 101 for propelling the vehicle 100. The method 200 is performed by a control arrangement such as the control arrangement 160. The activation state of the PTO 120 is either an activated state, during which the PTO 120 is configured to transfer a torque between the vehicle's power source 101 and an auxiliary load 121, or a deactivated state, during which no torque is transferred by the PTO 120 between the vehicle's power source 101 and the auxiliary load 121. The activation state of the PTO 120 is changed by engaging or disengaging a clutch of the PTO 119, respectively.

The method comprises, in step 210, when the power source 101 is connected to drive wheels of the vehicle 100, and when the activation state of the PTO 120 is to be changed, controlling the clutch of the PTO 119 in order to control a rate of change of torque transferred between the vehicle's power source 101 and the auxiliary load 121 during the change of the activation state of the PTO 120 based on at least one current operating condition of the vehicle 100.

The invention relates thus to a method for automatically controlling the activation and deactivation of the PTO 120 i.e., to automatically control the connection and the disconnection of the PTO to a vehicle power source 101.

Figures 2A, 2B:
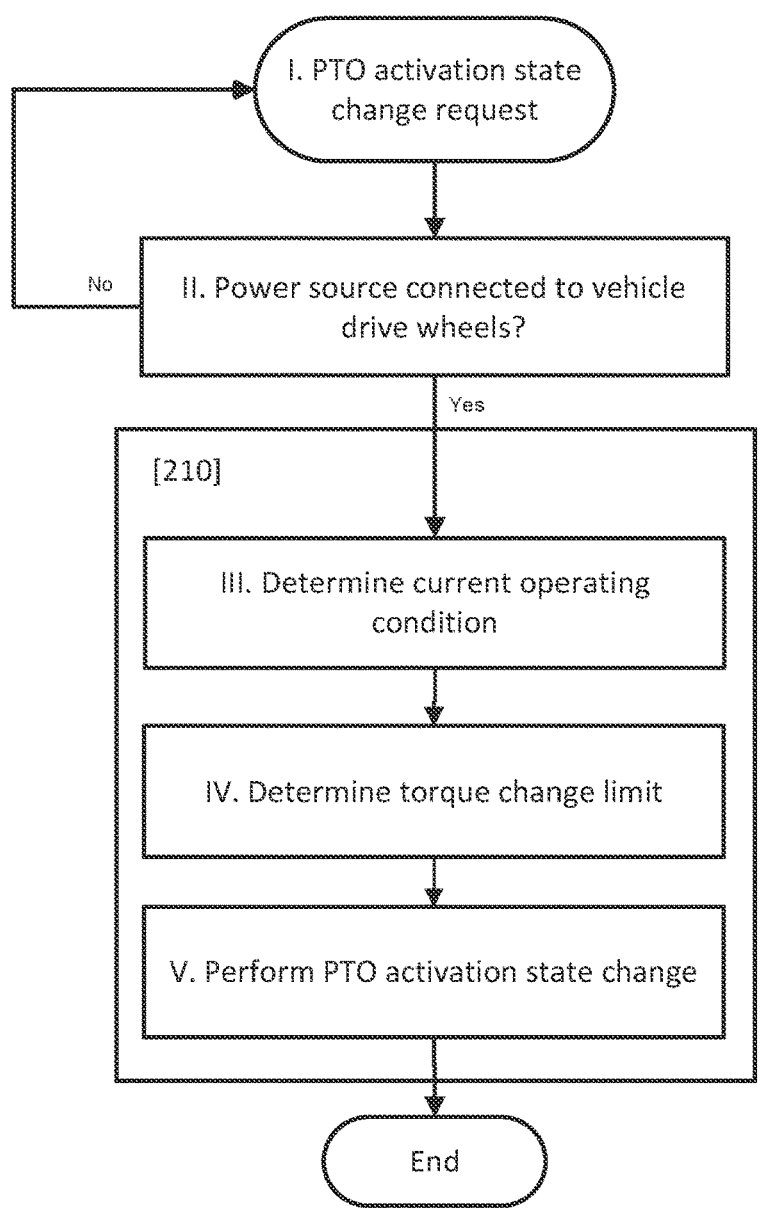
FIG. 2a shows a flow chart of a method according to embodiments of the invention.
FIG. 2b shows a flow chart of a method according to further embodiments of the invention.

In addition to the method step 210, the method 200 may, comprise optional steps as shown in FIG. 2b. FIG. 2b shows thus a flow chart of method 200 according to further embodiments of the invention. It should be noted that the method steps illustrated in FIG. 2b and described herein do not necessarily have to be executed in the order illustrated in FIG. 2b. The steps may essentially be executed in any suitable order, as long as the physical requirements and the information needed to execute each method step is available when the step is executed.

The method 200 and further embodiments of the invention illustrated in FIG. 2b are executed when the power source 101 is connected to drive wheels of the vehicle 100 i.e., during torque transfer between the power source 101 and the vehicle drive wheels 109a, 109b, and when a request to change the activation state of the PTO has been detected.

Thus, in step I in FIG. 2b, the method 200 is initiated upon detecting a PTO activation state change request. A PTO activation state change may be requested in several ways depending on the design and configuration of the PTO system. The PTO activation state change may, for example, be requested when the PTO is manually activated and deactivated by the vehicle operator using a lever or a switch. The manual activation and deactivation of the PTO may be performed from the vehicle 100 of by remote control, by means of e.g., a wireless control device. Another way of activating and deactivating the PTO is automatic activation and deactivation based on specific operating conditions, using sensor data and control algorithms. For example, when the auxiliary load is a compressor of a refrigerator unit, the PTO may be automatically engaged based on a temperature of the refrigerator unit. Such PTO activation state change request may be detected by or communicated to, according to conventional methods, the control arrangement 160.

In step II in FIG. 2b, it is determined whether the vehicle power source 101 is connected to the vehicle drive wheels 109a, 109b. Normally, such condition is fulfilled when the vehicle 100 is moving with the clutch 103 engaged and the gearbox 105 shifted to a gear other than the neutral gear. In that way, the power is transmitted between the power source and the drive wheels 109a, 109b via the clutch 103 and the gearbox 103. If the vehicle power source 101 is connected to the vehicle drive wheels 109a, 109b, i.e., "Yes", the method 200 continues to step III. Otherwise, if "No", the method 200 returns to step I.

According to previously known methods, when a request to change the activation state of the PTO has been detected and the power source 101 is connected to the vehicle drive wheels 109a, 109b, the PTO is activated or deactivated, depending on the activation state change request, by means of the PTO clutch 119, provided that any application specific requirements are fulfilled, such as e.g., vehicle speed.

Figure 3A:
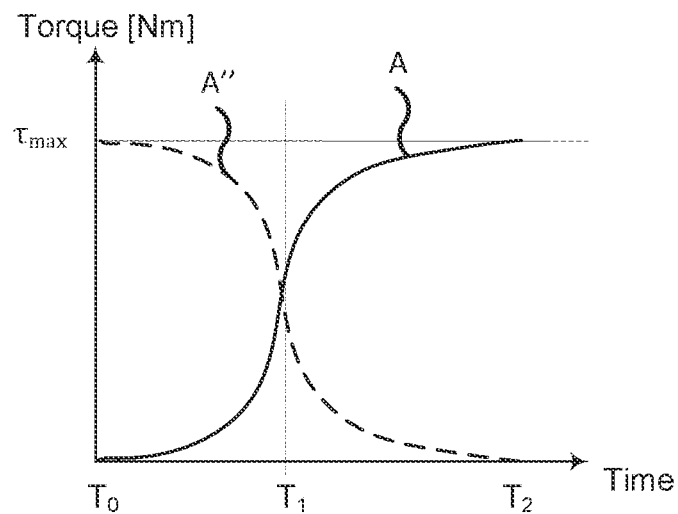
FIG. 3a illustrates aspects of torque transfer during the change of activation state of a PTO according to embodiments of the invention.

As previously mentioned, the rate of change of torque, i.e., the change in torque per time unit, during the PTO activation state change may affect the performance and drivability characteristics of the vehicle 100. FIG. 3a shows the torque transfer during PTO clutch engagement between the time instance $T_0$ and the time instance $T_2$ represented by the torque curve A. The curve shows how the transfer of the torque t from the vehicle power source 101 to the PTO 120 changes over time as the clutch plates of the PTO clutch 119 engage.

Figure 3B:
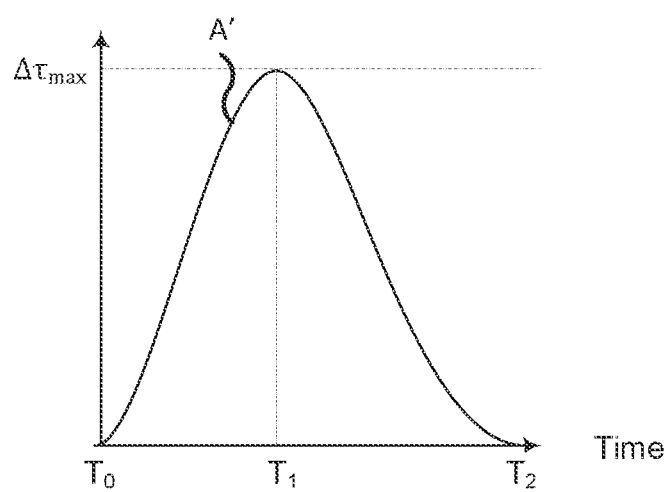
FIG. 3b illustrates aspects of rate of change of torque during the change of activation state of a PTO according to embodiments of the invention.

Initially, at the time instance $T_0$, as the clutch plates begin to engage, the torque transfer is low. As the clutch plates start to compress, the torque transfer increases rapidly until the clutch plates are fully engaged and the torque transfer reaches its maximum value $\tau_{max}$ at the time instance $T_2$. The slope of the torque curve represents the rate of change of torque $\Delta\tau$ during the PTO engagement process. FIG. 3b illustrates the corresponding rate of change of torque curve A' during the engagement process. The rate of change of torque reaches its maximum $\Delta\tau_{max}$ at the time instance $T_1$ where the slope of the torque transfer curve is steepest.

It is to be understood that both engagement and disengagement of the PTO clutch 119 may result in a similar rate of change of torque. As a reference, FIG. 3a also shows curve A" (dashed), instead representing the transferred torque as a function of time during a disengagement of the PTO clutch 119 corresponding to the rate of change of torque curve A'. Thus, the above reasoning applies also when the PTO activation state change request is a request for deactivation of the PTO.

In other words, during the PTO activation state change process, load on the vehicle power source 101 is rapidly changed. Due to inherent delay in the power source 101 torque regulation, the load change may cause sudden shift in the torque that currently is propelling the vehicle since the power source 101 is not able to momentarily adjust the delivered torque. Thus, the load change may result in an impact on the torque transferred between the vehicle power source 101 and the drive wheels of the vehicle. The larger the rate of change of torque during the PTO activation state change process, the higher the impact on the driveline 110. In some situations, such load change does not affect the operation of the vehicle. However, in other situations, sudden or rapid change in torque in the driveline could affect the stability and/or drivability of the vehicle.

The method 200 in step 210 in FIG. 2*b*, corresponding to the step 210 in FIG. 2*a*, controls the activation and deactivation of the PTO 120 by controlling the rate of change of torque during the change of the PTO activation state in situations where the operation of the vehicle would otherwise be negatively affected. The rate of change of torque during the change of the PTO activation state is controlled based on at least one current operating condition of the vehicle such that at least the above-mentioned drawbacks are mitigated. The rate of change of torque may for example be limited compared to the rate of change of torque according to previously known methods. The control of the PTO clutch 119 in step 210 may be performed according to further optional steps III-V.

In step III in FIG. 2*b*, at least one current operating condition of the vehicle 100 is determined. The at least one operating condition may be a condition or a parameter which may potentially limit the allowed rate of change of torque during the PTO activation state change either individually or in combination with other conditions/parameters.

In an embodiment of the invention, the current operating condition of the vehicle 100 may comprise one or more vehicle related parameters. The one or more vehicle related parameters may for example comprise the weight of the vehicle 100, a current speed of the vehicle 100, a current engaged gear in the vehicle gear box 105, and/or the torque required to power the auxiliary load. These parameters may be obtained from the vehicle's control system via one or more communication buses linking the control arrangement 160 with various components and controllers located on the vehicle.

The above mentioned vehicle related parameters may limit the allowed rate of change of torque during the PTO activation state change. For example, a heavy vehicle may be able to withstand a higher change in torque on its driveline 110 compared to a lighter vehicle. In similar fashion, a vehicle travelling with a higher speed may be affected to a greater extent by sudden driveline torque changes compared to a vehicle travelling at lower speed. Moreover, a higher driveline torque changes may be allowed when higher gear is engaged in a vehicle compared to lower gears. In other words, different operating conditions may be associated with different levels of allowed driveline torque changes. Exceeding such allowed level may cause stability and drivability problems in the vehicle 100.

In addition to the above-mentioned vehicle related parameters, further operating conditions may limit the rate of change of torque during the PTO activation state change.

In an embodiment of the invention, the current operating condition of the vehicle 100 may further comprise information related to a coming road section. The information related to the coming road section may comprise an inclination and/or a curvature of the coming road section. Such information related to the coming road section may furthermore comprise a characteristic of the surface of the coming road section and/or the current ambient temperature along the route travelled by the vehicle. Such characteristic may for example relate to friction of the road surface and may be used to detect the risk of slippery road conditions. Example of characteristics of the surface of a coming road section may include a temperature of the road surface and the occurrence of, and the amount of, ice and/or water on the road surface.

Moreover, the information related to the coming road section may include current traffic conditions along the route travelled by the vehicle 100. The current traffic conditions may for example include the speed of, and the distance to other vehicles and a presence of any obstacle close to the vehicle 100.

Information associated with the coming road section may be obtained according to conventional methods, for example from digital maps in combination with positioning information, e.g., global positioning system GPS information. The positioning information may be used to determine the location of the vehicle relative to the map data so that the road section information may be extracted from the map data. Information associated with the coming road section may furthermore be received by means of communication from at least one other vehicle. Such communication may e.g., be received by means of V2V communication, V2I communication, V2X communication, or similar. In another example, topographic information may be stored in the vehicle and retrieved in combination with positioning information. Information associated with the coming road section may, in yet another example, be obtained in the vehicle by means of onboard sensors collecting information associated with the coming road section.

In an embodiment of the invention, the clutch of the PTO 120 may be controlled such that different rates of change of torque are obtained for different operating conditions of the vehicle 100. According to a non-limiting example, several scenarios involving one of more operating conditions may be identified as potentially limiting the allowed rate of change of torque during the PTO activation state change. Different scenarios may impose different limitations on the allowed rate of change of torque. For example, the drivability of a vehicle travelling in low speed on a road with adequate friction may not be greatly affected by a sudden shift of momentum, i.e., by the change in the torque that currently is propelling the vehicle, due to a high rate of change of torque during a PTO activation state change. Such shift of momentum in this particular driving scenario is not expected to affect the stability of the vehicle and potentially lead to hazardous situations. Moreover, the driving comfort is not significantly negatively impacted since a short torque interference caused by the shift of momentum is probably expected by the vehicle operator when activating or deactivating a PTO. Therefore, the rate of change of torque during the PTO activation state change may not need to be limited during this particular driving scenario. On the other hand, when the speed of the vehicle increases, even small shifts of momentum may have large effect on the vehicle stability and need to be eliminated of at least decreased. One way of eliminating or decreasing shifts of momentum during a PTO activation state change is to limit the corresponding rate of change of torque according to the invention. Other potentially dangerous scenarios, where the rate of change of torque may need to be limited during the PTO activation state change, involve travelling on slippery roads, travelling in uphill grade, travelling on lower gears and or the presence of other vehicle or obstacles near the vehicle. Such identified scenarios and the limitations they impose on the allowed rate of change of torque may be available in the vehicle's control system.

In step IV in FIG. 2b, a torque change limit, i.e., the limit of the change of torque per time unit, is determined. The torque change limit may, for example, be determined by determining if the current operating conditions of the vehicle 100 determined in step III in FIG. 2b correspond to any of the above described scenarios limiting the allowed rate of change of torque and if so obtaining the corresponding limitations on the allowed rate of change of torque.

In an embodiment of the invention, the clutch of the PTO 119 may be controlled such that a resulting rate of change of torque during the change of the activation state of the PTO 120 is less than a first torque change limit. The first torque limit may here be understood as the above described limitation on the allowed rate of change of torque based on specific scenario. The first torque limit may be a limit preconfigured in the control system of the vehicle 100 and may differ for different scenarios and different operating conditions of the vehicle 100.

In an embodiment of the invention, the first torque change limit may be based on the at least one current operating condition of the vehicle 100 and/or a torque required to power the auxiliary load 121.

In step V in FIG. 2b, the requested PTO activation state change is performed by engaging or disengaging the PTO clutch 119. The PTO activation state change may be performed such that the torque change limit determined in step IV is not exceeded. As previously explained, the rate of change of torque during the PTO activation state change may need to be limited compared to previously known methods, to reduce its impact on the vehicle driveline 110. Such limiting of the rate of change of torque according to embodiments of the invention is illustrated in FIG. 4a and FIG. 4b.

Figure 4A:
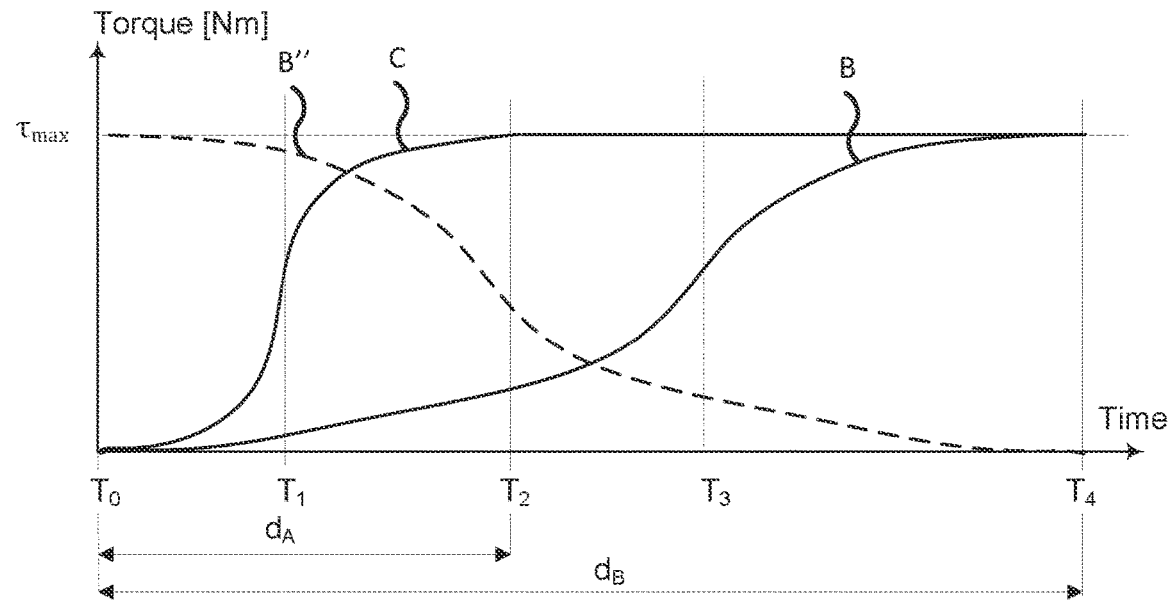
FIG. 4a illustrates aspects of torque transfer during the change of activation state of a PTO according to further embodiments of the invention.
Figure 4B:
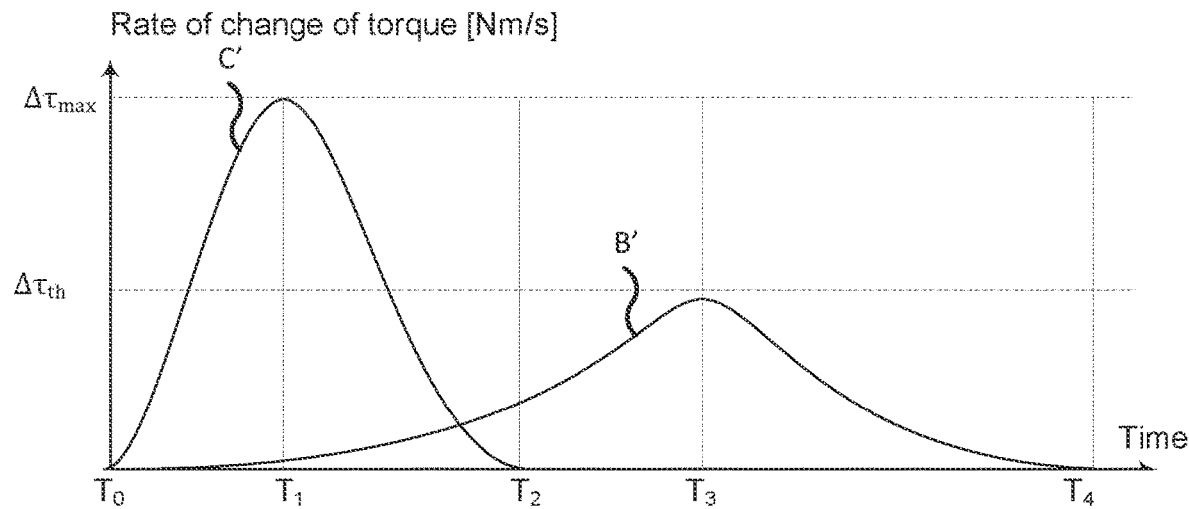
FIG. 4b illustrates aspects of adjusting the rate of change of torque during the change of activation state of a PTO according to further embodiments of the invention.

In similar way as illustrated in FIG. 3a, FIG. 4a shows the torque transfer during PTO activation state change. In FIG. 4a the torque curve C corresponds to the curve A illustrated in FIG. 3a and represents the torque transfer during PTO clutch 119 engagement performed between the time instance $T_0$ and the time instance $T_2$. The corresponding curve C' showing the rate of change of torque resulting from curve C in FIG. 4a is shown in FIG. 4b and corresponds to curve A' illustrated in FIG. 3b.

In an embodiment of the invention, changing the activation state of the PTO 120 may be carried out over a state change duration d and the controlling of the rate of change of torque may comprise controlling the state change s illustrated in FIG. 4a. FIG. 4b shows curve B representing the torque transfer during engagement of the same PTO clutch as in curve C. Here, changing the activation state of the PTO 120 is carried out over a state change duration de between time instance $T_0$ and the time instance $T_4$, i.e., during a longer duration than the state change duration da of the PTO clutch engagement represented by the torque curve C. In similar fashion as for curve C, at the time instance $T_0$ the clutch plates begin to engage. However, here the clutch plates are not fully engaged until the time instance $T_4$ when the torque transfer reaches its maximum value $\tau_{max}$. FIG. 4b illustrates the corresponding rate of change of torque curve B' during the engagement process. The rate of change of torque reaches its maximum at the time instance $T_3$ where the slope of the torque transfer curve B is steepest. The maximum rate of change of torque of the curve B' is lower than that of the curve C' and does not exceed a torque change limit $\Delta\tau_{th}$. The maximum rate of change is hereby limited to not exceed the torque change limit $\Delta\tau_{th}$ by extending the state change duration d. The predetermined torque change limit $\Delta\tau_{th}$ may correspond to the previously described first torque change limit. The clutch plates are controlled to engage more slowly during the PTO engagement process represented by the curves B and B' compared to the process represented by the curves C and C' resulting in a slower change in load on the vehicle power source 101 as the same amount of torque is transferred in both cases.

Moreover, as a reference FIG. 4a also show curve B" (dotted) instead representing the transferred torque as a function of time during a disengagement of the PTO clutch corresponding to the rate of change of torque curve B'. Thus, the above reasoning applies also when the PTO activation state change request is a request for deactivation of the PTO, where the opening time of the PTO clutch can be controlled to open the PTO clutch 119 more slowly.

The controlling of the rate of change of torque may thus comprise controlling the state change duration d. Consequently, increasing the state change duration d of the PTO engagement process may reduce the resulting maximum rate of change of torque.

In an embodiment of the invention, the changing of the activation state of the PTO 120 may comprise activating the PTO 120 by engaging the clutch of the PTO 119 when disengaged and wherein controlling of the state change duration d may comprise controlling the duration of engaging the clutch. Moreover, the changing of the activation state of the PTO 120 may comprise deactivating the PTO 120 by disengaging the clutch of the PTO 119 when engaged and wherein controlling of the state change duration d may comprise controlling the duration of disengaging of the clutch. As previously described, the state change duration d of the PTO is associated with the rate of change of torque during the PTO activation state change. A longer state change duration results in limited rate of change of torque during the PTO. The state change duration d may thus be optimized e.g., by controlling the opening/closing of the PTO clutch to improve vehicle stability and drivability.

In an embodiment of the invention, a torque change resulting from the change of the activation state of the PTO 120 may be anticipated at the drive wheels of the vehicle 100. The clutch of the PTO 119 may thus be controlled further based on the anticipated torque change at the drive wheels of the vehicle 100 such that the rate of change of torque transferred between the vehicle's power source 101 and the auxiliary load 121 during the change of the activation state of the PTO 120 is reduced when the torque change at the drive wheels of the vehicle 100 exceeds a second torque change limit. The second torque change limit may be a limit above which the stability and/or the drivability of the vehicle is affected in a negative way. The second torque change limit may be a limit preconfigured in the control system of the vehicle 100 and may differ for different scenarios and different operating conditions of the vehicle 100 in a similar way as described with reference to the first torque change limit.

The method 200 end when the requested PTO activation state change has been performed and is initiated upon detecting a further PTO activation state change request.

According to an aspect of the invention, a control arrangement 160 for changing an activation state of a PTO 120 in a vehicle 100 is presented. The control arrangement 160 includes means 161 for controlling the clutch of the PTO 119 in order to control a rate of change of torque transferred between the vehicle's power source 101 and the auxiliary load 121 during the change of the activation state of the PTO 120 based on at least one current operating condition of the vehicle 100.

The control arrangement 160, e.g. a device or a control device according to the invention may be arranged for performing all of the above, in the claims, and in the herein described embodiments method steps. The control arrangement 160 is hereby provided with the above-described advantages for each respective embodiment. The invention is also related to a vehicle 100 including the control arrangement 160.

Figure 5:
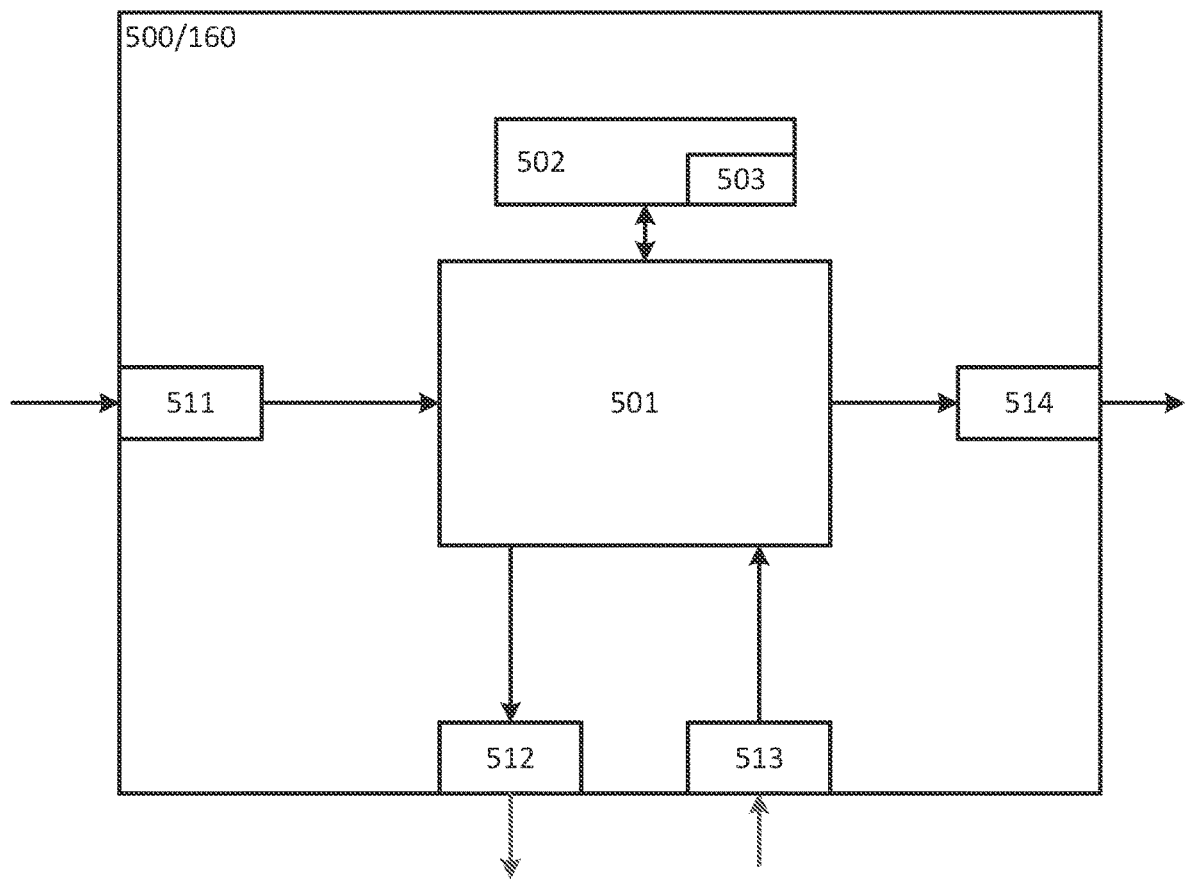
FIG. 5 shows a control arrangement, in which a method according to any one of the herein described embodiments may be implemented.

Now turning to FIG. 5 which illustrates the control arrangement 500/160, which may correspond to or may include the above-mentioned control unit 161 i.e. the control unit performing the method step of the invention. The control arrangement 500/160 comprises a computing unit 501, which can be constituted by essentially any suitable type of processor or microcomputer, e.g. a circuit for digital signal processing (Digital Signal Processor, DSP), or a circuit having a predetermined specific function (Application Specific Integrated Circuit, ASIC). The computing unit 501 is connected to a memory unit 502 arranged in the control arrangement 500/160, which memory unit provides the computing unit 501 with, e.g., the stored program code and/or the stored data which the computing unit 501 requires to be able to perform computations. The computing unit 501 is also arranged to store partial or final results of computations in the memory unit 502.

In addition, the control arrangement 500/160 is provided with devices 511, 512, 513, 514 for receiving and transmitting input and output signals. These input and output signals can contain waveforms, impulses, or other attributes which, by the devices 511, 513 for the reception of input signals, can be detected as information and can be converted into signals which can be processed by the computing unit 501. These signals are then made available to the computing unit 501. The devices 512, 514 for the transmission of output signals are arranged to convert signals received from the computing unit 501 in order to create output signals by, e.g., modulating the signals, which can be transmitted to other parts of and/or systems in the vehicle 100.

Each of the connections to the devices for receiving and transmitting input and output signals can be constituted by one or more of a cable; a data bus, such as a Controller Area Network CAN bus, a Media Orientated Systems Transport MOST bus, or some other bus configuration; or by a wireless connection. A person skilled in the art will appreciate that the above-stated computer can be constituted by the computing unit 501 and that the above-stated memory can be constituted by the memory unit 502.

Control systems in modern vehicles commonly comprise communication bus systems consisting of one or more communication buses for linking a number of electronic control units ECU's, or controllers, and various components located on the vehicle. Such a control system can comprise a large number of control units and the responsibility for a specific function can be divided amongst more than one control unit. Vehicles of the shown type thus often comprise significantly more control units than are shown in FIGS. 1 and 5, which is well known to the person skilled in the art within this technical field.

In a shown embodiment, the invention may be implemented by the above-mentioned control unit 161. The invention can also, however, be implemented wholly or partially in one or more other control units already in the vehicle 100, or in some control unit dedicated to the invention.

Here and in this document, units are often described as being arranged for performing steps of the method according to the invention. This also includes that the units are designed to and/or configured to perform these method steps.

The control unit 161 is in FIG. 1 illustrated as a separate unit. This unit may, however, be logically separated but physically implemented in the same unit or can be both logically and physically arranged together. The unit may e.g. correspond to groups of instructions, which can be in the form of programming code, that are input into, and are utilized by a processor/computing unit 501 when the unit is active and/or is utilized for performing its method step.

The person skilled in the art will appreciate that the herein described embodiments for changing an activation state of a PTO 120 in a vehicle 100 may also be implemented in a computer program, which, when it is executed in a computer, instructs the computer to execute the method. The computer program is usually constituted by a computer program product 503 stored on a non-transitory/non-volatile digital storage medium, in which the computer program is incorporated in the computer-readable medium of the computer program product. The computer-readable medium comprises a suitable memory, such as, e.g.: Read-Only Memory ROM, Programmable Read-Only Memory PROM, Erasable PROM EPROM, Flash memory, Electrically Erasable PROM EEPROM, a hard disk unit, etc.

The invention is not limited to the above-described embodiments. Instead, the invention relates to, and encompasses all different embodiments being included within the scope of the independent claims.

The invention claimed is:

1. A method performed by a control arrangement for changing an activation state of a power take-off (PTO) in a vehicle, the vehicle comprising a power source for propelling the vehicle, wherein the activation state of the PTO is either an activated state, during which the PTO is configured to transfer a torque between the vehicle's power source and an auxiliary load, or a deactivated state, during which no torque is transferred by the PTO between the vehicle's power source and the auxiliary load, and wherein the activation state of the PTO is changed by engaging or disengaging a clutch of the PTO, respectively, the method comprising, when the power source is connected to drive wheels of the vehicle, and when the activation state of the PTO is to be changed:
   determining an anticipated torque change at the drive wheels of the vehicle resulting from changing the activation state of the PTO; and
   controlling the clutch of the PTO in order to control a rate of change of torque transferred between the vehicle's power source and the auxiliary load during the change of the activation state of the PTO, wherein control of the clutch of the PTO is based on the anticipated torque change at the drive wheels of the vehicle such that the rate of change of torque transferred between the vehicle's power source and the auxiliary load during the change of the activation state of the PTO is reduced when the torque change at the drive wheels of the vehicle exceeds a second torque change limit.

2. The method according to claim 1, further comprising controlling the clutch of the PTO such that different rates of change are obtained for different operating conditions of the vehicle.

3. The method according to claim 1, further comprising controlling the clutch of the PTO such that a resulting rate of change of torque during the change of the activation state of the PTO is less than a first torque change limit.

4. The method according to claim 3, wherein the first torque change limit is based on the at least one current operating condition of the vehicle and/or a torque required to power the auxiliary load.

5. The method according to claim 1, wherein changing the activation state of the PTO is carried out over a state change duration, and wherein controlling of the rate of change of torque comprises controlling the state change duration.

6. The method according to claim 5, wherein the changing of the activation state of the PTO comprises:
   activating the PTO by engaging the clutch of the PTO when disengaged and wherein controlling of the state change duration comprises controlling a duration of engaging the clutch; and/or
   deactivating the PTO by disengaging the clutch of the PTO when engaged and wherein controlling of the state change duration comprises controlling the duration of disengaging of the clutch.

7. The method according to claim 1, wherein the current operating condition of the vehicle comprises one or more vehicle related parameters, the one or more vehicle related parameters comprising:
   a vehicle weight;
   a current speed of the vehicle;
   a current engaged gear in the vehicle gear box; and/or
   a torque required to power the auxiliary load.

8. The method according to claim 7, wherein the current operating condition of the vehicle further comprises information related to a coming road section, the information related to the coming road section comprises one or more of:
   an inclination of a coming road section;
   a curvature of a coming road section;
   a characteristic of a surface of a coming road section;
   current traffic conditions along a route travelled by the vehicle; and/or
   current ambient temperature along the route travelled by the vehicle.

9. A control arrangement for changing an activation state of a power take-off in a vehicle, the vehicle comprising a power source for propelling the vehicle, wherein the activation state of the PTO is either an activated state, during which the PTO is configured to transfer a torque between the vehicle's power source and an auxiliary load, or a deactivated state, during which no torque is transferred by the PTO between the vehicle's power source and the auxiliary load, and wherein the activation state of the PTO is changed by engaging or disengaging a clutch of the PTO, respectively, the control arrangement being configured to, when the power source is connected to drive wheels of the vehicle, and when the activation state of the PTO is to be changed:
   determine an anticipated torque change at the drive wheels of the vehicle resulting from changing the activation state of the PTO; and
   control the clutch of the PTO in order to control a rate of change of torque transferred between the vehicle's power source and the auxiliary load during the change of the activation state of the PTO, wherein control of the clutch of the PTO is based on the anticipated torque change at the drive wheels of the vehicle such that the rate of change of torque transferred between the vehicle's power source and the auxiliary load during the change of the activation state of the PTO is reduced when the torque change at the drive wheels of the vehicle exceeds a second torque change limit.

10. A vehicle comprising a control arrangement for changing an activation state of a power take-off in a vehicle, the vehicle comprising a power source for propelling the vehicle, wherein the activation state of the PTO is either an activated state, during which the PTO is configured to transfer a torque between the vehicle's power source and an auxiliary load, or a deactivated state, during which no torque is transferred by the PTO between the vehicle's power source and the auxiliary load, and wherein the activation state of the PTO is changed by engaging or disengaging a clutch of the PTO, respectively, the control arrangement being configured to, when the power source is connected to drive wheels of the vehicle, and when the activation state of the PTO is to be changed:
   determine an anticipated torque change at the drive wheels of the vehicle resulting from changing the activation state of the PTO; and
   control the clutch of the PTO in order to control a rate of change of torque transferred between the vehicle's power source and the auxiliary load during the change of the activation state of the PTO, wherein control of the clutch of the PTO is based on the anticipated torque change at the drive wheels of the vehicle such that the rate of change of torque transferred between the vehicle's power source and the auxiliary load during the change of the activation state of the PTO is reduced when the torque change at the drive wheels of the vehicle exceeds a second torque change limit.

11. A computer program product comprising a computer program code stored on a non-transitory computer-readable medium, said computer program product used for changing an activation state of a power take-off in a vehicle, the vehicle comprising a power source for propelling the vehicle, wherein the activation state of the PTO is either an activated state, during which the PTO is configured to transfer a torque between the vehicle's power source and an auxiliary load, or a deactivated state, during which no torque is transferred by the PTO between the vehicle's power source and the auxiliary load, and wherein the activation state of the PTO is changed by engaging or disengaging a clutch of the PTO, respectively, said computer program code comprising computer instructions to cause one or more control devices to perform the following operations when the power source is connected to drive wheels of the vehicle, and when the activation state of the PTO is to be changed:
   determine an anticipated torque change at the drive wheels of the vehicle resulting from changing the activation state of the PTO; and
   control the clutch of the PTO in order to control a rate of change of torque transferred between the vehicle's power source and the auxiliary load during the change of the activation state of the PTO, wherein control of the clutch of the PTO is based on the anticipated torque change at the drive wheels of the vehicle such that the rate of change of torque transferred between the vehicle's power source and the auxiliary load during the change of the activation state of the PTO is reduced when the torque change at the drive wheels of the vehicle exceeds a second torque change limit.

12. The control arrangement according to claim 9, further configured to control the clutch of the PTO such that different rates of change are obtained for different operating conditions of the vehicle.

13. The control arrangement according to claim 9, further configured to control the clutch of the PTO such that a resulting rate of change of torque during the change of the activation state of the PTO is less than a first torque change limit.

14. The control arrangement according to claim 13, wherein the first torque change limit is based on the at least one current operating condition of the vehicle and/or a torque required to power the auxiliary load.

15. The control arrangement according to claim 9, wherein changing the activation state of the PTO is carried out over a state change duration, and wherein controlling of the rate of change of torque comprises controlling the state change duration.

16. The control arrangement according to claim 15, wherein the changing of the activation state of the PTO comprises:
   activating the PTO by engaging the clutch of the PTO when disengaged and wherein controlling of the state change duration comprises controlling a duration of engaging the clutch; and/or
   deactivating the PTO by disengaging the clutch of the PTO when engaged and wherein controlling of the state change duration comprises controlling the duration of disengaging of the clutch.

17. The control arrangement according to claim 9, wherein the current operating condition of the vehicle comprises one or more vehicle related parameters, the one or more vehicle related parameters comprising:
   a vehicle weight;
   a current speed of the vehicle;
   a current engaged gear in the vehicle gear box; and/or
   a torque required to power the auxiliary load.

18. The control arrangement according to claim 17, wherein the current operating condition of the vehicle further comprises information related to a coming road section, the information related to the coming road section comprises one or more of:
   an inclination of a coming road section;
   a curvature of a coming road section;
   a characteristic of a surface of a coming road section;
   current traffic conditions along a route travelled by the vehicle; and/or
   current ambient temperature along the route travelled by the vehicle.

* * * * *